United States Patent [19]

Lockwood, Sr.

[11] Patent Number: 4,800,676
[45] Date of Patent: Jan. 31, 1989

[54] TREE PROTECTOR

[76] Inventor: Richard E. Lockwood, Sr., 62 Tindall Rd., Robbinsville, N.J. 08619

[21] Appl. No.: 929,338

[22] Filed: Nov. 10, 1986

[51] Int. Cl.⁴ .................... A01G 17/12; A01M 1/18
[52] U.S. Cl. .......................................... 47/24; 43/108
[58] Field of Search ............................. 47/23-25; 43/108, 109, 126, 131, 132.1

[56] References Cited

U.S. PATENT DOCUMENTS

| | | | |
|---|---|---|---|
| 1,415,134 | 5/1922 | Williams | 47/23 X |
| 1,579,534 | 4/1926 | Hibbard et al. | 47/23 X |
| 1,674,118 | 6/1928 | Merrick | 47/24 X |
| 1,987,394 | 1/1935 | Emerson | 47/24 |
| 2,011,405 | 8/1935 | Giliassao | 47/24 |
| 2,240,766 | 5/1941 | Elder | 43/108 |
| 4,000,971 | 1/1977 | Gaskins | 47/24 X |
| 4,555,866 | 12/1985 | Stone | 47/23 |

FOREIGN PATENT DOCUMENTS

| | | | |
|---|---|---|---|
| 68818 | 5/1915 | Austria | 47/24 |
| 913644 | 9/1946 | France | 47/24 |

*Primary Examiner*—Mickey Yu
*Assistant Examiner*—Danton D. DeMille
*Attorney, Agent, or Firm*—Thomas R. Farino, Jr.

[57] ABSTRACT

An improved tree protector of the type adapted to prevent insects from crawling up the trunk of a tree is described in which a continuous corrugated trough-like member is provided for extending about a tree trunk and for receiving an insecticide. The ends of said trough-like member are joined by an appropriate seal to form a continuous trough. An appropriate sealant mastic is provided to create a more secure seal in combination with adhesive tape.

1 Claim, 1 Drawing Sheet

U.S. Patent
Jan. 31, 1989
4,800,676
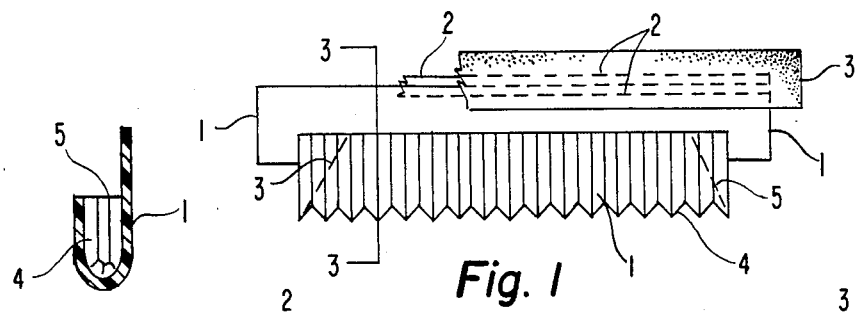
Fig. 1
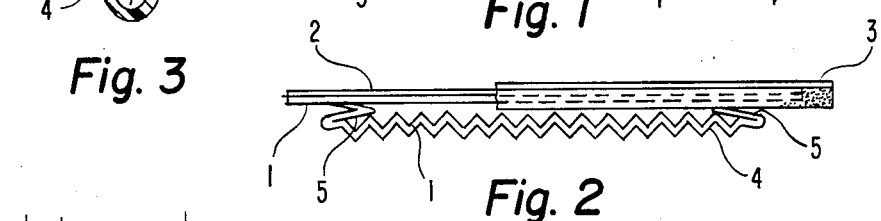
Fig. 2
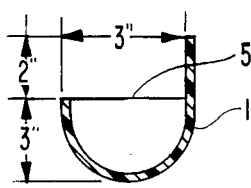
Fig. 3
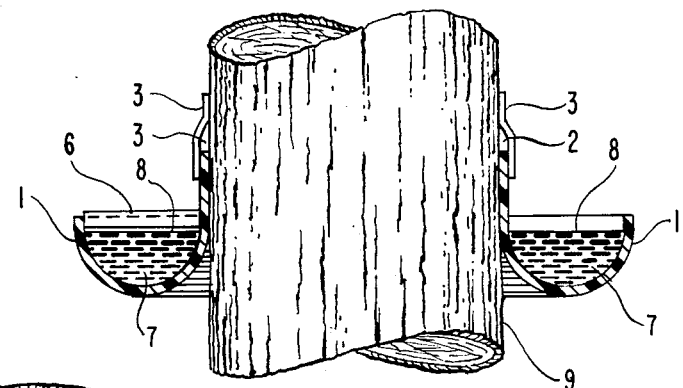
Fig. 4
Fig. 5
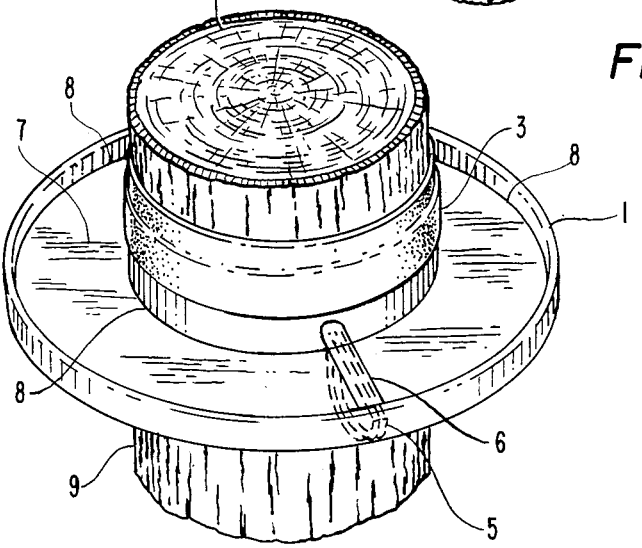
Fig. 6

TREE PROTECTOR

The present invention relates to an improved tree protector of the type adapted to prevent insects from crawling up the trunk of a tree.

The present commercial methods of insect control involve spraying the desired tree with chemicals poisonous to the insects or to place a tent over a tree and to fumigate with a poisonous gas. Attendant problems associated with these methods involve destruction of the tree if weather conditions are not ideal; additionally if the timing of the application is not correct all of the insects may not be killed or if the application is too late considerable tree damage has already taken place.

While the above are the typical commercial methods presently available, devices are illustrated in patents adapted to fit about the trunk of a given tree to prevent insects from crawling up the tree. These devices have not achieved great commercial success due to the various impractical limitations associated with their constructions.

The average present protection does no more than the equivalent of wrapping a piece of burlap or paper saturated with tar or sticky material about the trunk of a tree. These substances however dry out quickly and become ineffective and ultimately form a sort of bridge so that other insects can crawl over the obstruction.

The present invention is designed to overcome the limitations of the prior art by providing an effective tree protector which will prevent insects from crawling up the trunk of the tree for long periods of time without requiring the frequent attention of an individual or operator. In addition, the device permits the growth of the tree without damage thereto and in the preferred embodiment provides a moat or trough through which the insects must pass in climbing the tree. In this fashion, a small amount of liquid may be used for repelling or killing the insects.

An object of the present invention is to provide an inexpensive tree protector which may be serviced with a minimum of time and infrequent intervals.

Another object of the present invention is to provide an inexpensive tree protector which will operate for long periods of time without requiring attention or service.

Another object of the present invention is to provide an inexpensive tree protector which will permit the growth of the tree without impairing the protector with a seal between it and the tree.

Another object of the present invention is to provide a tree protector having a trough through which insects passing on the tree will have to crawl.

Another object of the present invention is to provide a tree protector which is adjustable to different sizes of trees.

Another object of the present invention is the provision of an insect guard which can be formed in long continuous strips and adjusted as needed on the job.

Still another object of the present invention is the provision of an insect guard for trees which is simple and economical to manufacture and quickly and easily applied.

Other and further objects of the invention will be obvious upon an understanding of the illustrative embodiment about to be described or be indicated in the appended claims and various advantages not referred to herein will occur to one skilled in the art upon employment of the invention in practice.

Referring to the drawings:

FIG. 1 represents a front view of the insect guard with the trough in folded position.

FIG. 2 represents a top view of the insect guard with the trough in folded position.

FIG. 3 represents a cut view showing an end portion of the insect guard in folded position showing the position of the accordion pleats.

FIG. 4 depicts the insect guard with the trough in the wrap-around position.

FIG. 5 is an elevation showing a cross section of the insect guard trough as applied to a tree trunk.

FIG. 6 is a full elevation of the insect guard as applied to a tree trunk depicting a level of insecticide contained in the trough.

Almost every homeowner that has trees on his property has been plagued at one time or another by masses of crawling insects such as gypsy moth larvae which migrate from the ground into the trees. To protect the trees from these insects, various protective devices of different design have been used. Some are effective but many are too expensive and unadaptable for wide applications to different sizes of trees.

Referring again to the drawings and more particularly to FIGS. 5 and 6, there is shown a fragmentary section of a tree 9 to which is applied an insect guard comprising a trough portion 1, a sealant mastic 2, adhesive tape 3, end joint 5 and end joint seal 6.

Preferably sealant material 2 is comprised of a sheet of asbestos or other suitable material such as plastic. The trough comprises a semi-circular member 1, the sides of which may be corrugated 4 to permit expansion and to take up irregularities in the shape or size of a given tree.

Preferably the corrugations 4 extend the full length of trough member 1 to facilitate application of the trough-like member and to permit growth of the tree. End joint members 5 are provided and are joined by end joint seal 6.

In order to form a more secure seal which will prevent insects from crawling under the trough member 1 and sealant 2, and thereby avoid the necessity of crawling over the trough, a suitable adhesive tape 3 is applied to the sealant.

While a liquid insecticide 7 is shown filled to level 8 in the drawings, the invention is not limited to this form of repellant. Various types of repellant are now known and applicant contemplates use of a liquid in some cases and in other cases dry or powdered gas-generating substances.

Preferably the repellant used is of a type which either evaporates slowly or to no appreciable extent at all. It may also be comprised in part of a hygroscopic substance, one which readily absorbs and readily retains moisture. The use of such materials in the trough minimizes the need of reservicing it at frequent intervals. The tree insect guard may thus be left without inspection and attention for considerable periods of time.

Glycerine is an example of a hygroscopic substance which may be used as a repellant-carrying base. An excellent repellant is the combination of glycerine, pine oil treated with potassium oleate and nicotine. Another repellant is pine oil. Various non-drying oils are examples of bases which do not quickly evaporate.

Having described a preferred embodiment of my invention, it is understood that various changes can be made without departing from the spirit of my invention and I desire to cover by the appended claims all such modifications as fall within the true spirit and scope of my invention.

What is claimed is:

1. In a tree protector, the combination of a corrugated plastic trough-shaped member having an inner wall and an outer wall extending continuously about the tree including an hygroscopic insecticide in said trough the ends of said trough-shaped member being joined by a seal to maintain the effective continuity of the trough, sealant means including asbestos attached to said trough-shaped member at the upper end of the inside wall and extending around the tree between said member and said tree, the inner wall of said trough-shaped member extending a short distance above the outer wall of said member and in direct contact with the outer surface of said tree and said sealant, and adhesive tape for forming a seal between said member and said tree at the top of the inner wall for preventing passage of insects up the tree between the tree and the corrugated trough-shaped member.

* * * * *